July 7, 1970 A. S. KLINE 3,519,749

EMERGENCY WARNING SYSTEM

Filed April 26, 1967 4 Sheets-Sheet 1

INVENTOR:
ALEXANDER S. KLINE
BY Dawson, Tilton, Fallon, Lungmus & Alexander
ATT'YS

EMERGENCY WARNING SYSTEM

Filed April 26, 1967 4 Sheets-Sheet 2

INVENTOR:
ALEXANDER S. KLINE
BY
Dawson, Tilton, Fallon, Lungmus & Alexander
ATT'YS INVENTOR:
ALEXANDER S. KLINE
BY
Dawson, Tilton, Fallon, Lungmus & Alexander
ATT'YS INVENTOR:
ALEXANDER S. KLINE
BY
Dawson, Dillon, Dalloy, Lungmus, Alexander
ATT'YS 3,519,749

EMERGENCY WARNING SYSTEM

Alexander S. Kline, Phoenix, Ariz., assignor to BBP Electronics, Inc., a corporation of Kansas Filed Apr. 26, 1967, Ser. No. 633,771
Int. Cl. H04j 3/12
U.S. Cl. 179—15 9 Claims

ABSTRACT OF THE DISCLOSURE

An emergency warning system coupled into a commermercial telephone network. The system includes a transmitter controlled by signals received over telephone trunk lines for generating signals which are encoded and transmitted to individual remote receivers. A number of channels are provided for selectively signalling certain of the receivers without interfering with receivers keyed to adjacent channels. The system is rendered fail-safe by providing for an increased signal to noise ratio while transmitting, by including logic circuitry for checking received signals, and by requiring repetitive signals before energizing an alarm. A digital communication channel and a voice frequency channel are incorporated into the system.

BACKGROUND

The present invention relates to emergency warning systems; more particularly, it relates to an emergency warning system which may be operated through a commercial telephone network for selectively signalling certain remote receivers.

Prior emergency warning systems include externally-mounted sirens and the like for generating an audible signal under emergency conditions. However, prevailing construction techniques are making offices and homes virtually sound-proof. Further, the ambient noise level within homes and offices equipped, for instance, with air conditioning and the like, has been on the increase in the past years. It is, therefore, practically impossible to hear externally-mounted warning systems in certain cases.

Radio channels and television stations have been set up to broadcast emergency warning information, but these systems are not operative unless the receiving equipment is active at the time the information is being transmitted. Hence, the use of commercial broadcasting systems is severely limited.

Emergency warning systems have been suggested which transmit information by means of conventional radio techniques. However, for the most part they have employed tone modulation techniques in which tones of various discrete frequencies are transmitted in combinations for generating a code to remotely signal a receiver. Because of the fact that voice communication is composed of many combinations of such tones, the possibility for interfering with these voice radio transmission techniques is enhanced, and false signals are likely to arise. Further, government regulations on transmitting equipment used for these purposes is restricted to operation over a certain frequency range which also decreases their value for emergency warning systems.

SUMMARY OF THE INVENTION

The present invention provides for an emergency warning system controlled over available telephone lines accessible only to a certain class of subscribers.

The emergency warning system of the present invention, although in its broader aspects is not so limited, is designed to be incorporated into existing commercial telephone networks, and to be controlled with signals used in telephone communications, namely, the ringing signal and the shorted line or hang-up signal.

This feature expands the utility of the system since not only civil defense, but fire, police and weather emergency warning information may be transmitted without requiring the laying of additional cable.

In addition to the increased usefulness of the system, its reliability and security is substantially increased by providing that only certain groups of telephone users are permitted access to the warning system, and even they must follow a prescribed signalling routine to enter into control of the recievers.

The transmitter of the present system uses digital techniques in processing the emergency warning information and transmits this information via radio communications using pulse position modulation (PPM) to individual remote subscribers. A voice communication channel is also provided. The carrier frequency in the transmitter is kept on in its normal state, that is, when emergency warning information is not being transmitted. Due to automatic gain control in the receiver, the signal to noise ratio of the communication link is enhanced, and the possibility of a noise interfering with the system is reduced. In addition, the receiver employs a unique digital processing technique for rendering the system fail-safe, and requires a repetitive transmission of emergency warning information before signalling an alarm. Reception of the digital information establishes its associated voice channel which is time-shared with the digital signals.

The system may be expanded to accommodate an increased number of channels without requiring an increase of frequency band thereby allowing the system capabilities to be increased modularly with minor additions to the system. Further, each channel is operated independently of all other channels, and a given reception zone may be subdivided such that a particular channel will signal only certain areas within the zone while not alerting adjacent areas. A convenient means of checking all the system components for operability is also provided.

Other features and advantages of the present invention will be obvious to persons skilled in the art from the following detailed description of a preferred embodiment accompanied by the attached drawing in which identical reference numerals will refer to similar elements in the various views.

THE DRAWING

DETAILED DESCRIPTION

Figure 1:
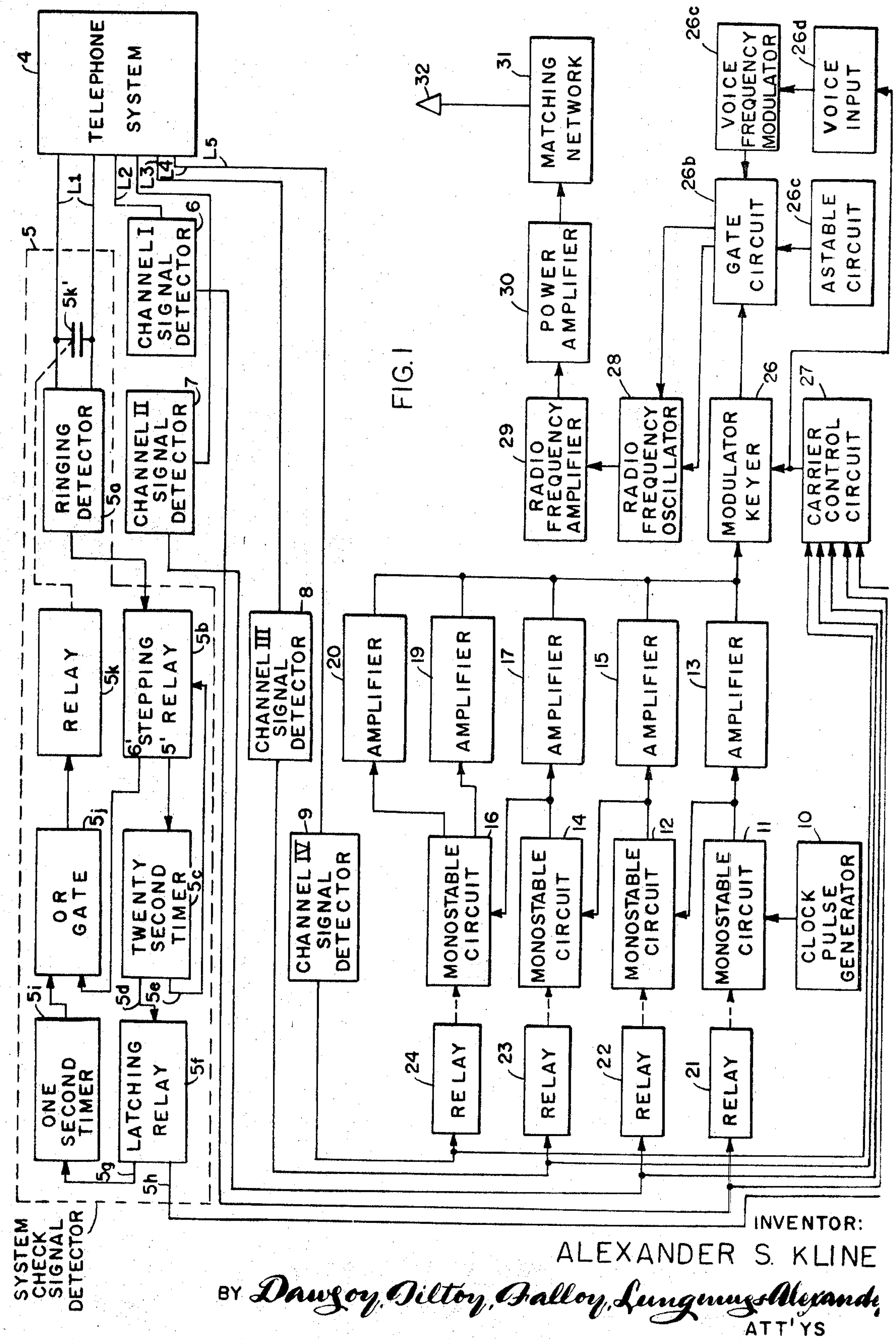
FIG. 1 is a functional block schematic of a transmitter and its associated control circuitry according to the present invention.

Normally, commercial telephone networks reserve a block of numbers which are classified, for example, as Code IC numbers and are allocated only to certain public departments likely to require reliable communication links in an emergency.

Stations to which such numbers are assigned may enter into the larger telephone network to call other numbers, but only stations having these Code IC numbers are able to call other stations having numbers in the same reserved block. The reason for this is so that in an emergency, information can be communicated between the departments most concerned without interference from the public in tying up vital lines.

The present system is preferably used with such reserved blocks of telephone numbers; and, in addition, a person wishing to control a transmitter must have knowledge of the system in order to follow a prescribed procedure for signalling an alarm. The reason for this precaution is that it is possible that during installation, an improper hook up would allow an unwanted telephone number of enter the emergency information lines. In this event, unless the caller lets the telephone ring a predetermined number of times and then interrupts the line by hanging up, he still would not trigger the present emergency warning system. Hence, the present system accounts for possible human error as well as electrical noise in providing a system which is reliable and one which is very flexible and easily implemented on existing communication networks.

As has been indicated, any commercial telephone system may transmit the alert signals for signalling remote transmitters. Hence, in FIG. 1 a commercial telephone system is referred to as 4, and from it there are five separate input lines to the transmitter. These are conventional telephone lines comprising a twisted pair of wires, and they are referred to as L1, L2, L3, L4, and L5. Only L1 is shown as a pair of wires coming from the telephone system 4 but it is noted that each of the other lines is also a twisted pair, and they have been schematically represented. Further, the illustrated embodiment has four channels, as will be clear presently, but the system may have up to fifteen or twenty, if desired, with corresponding additional lines. Each of the lines L1–L5 represents a separate telephone number which has been set aside out of the Code IC block, and each may be separately called. If L3 is called, none of the others will respond.

The line L1 is connected to the input of a system check signal detector outlined in dashed line and denoted 5. Line L2 is connected to the input of Channel I signal detector 6; line L3 is connected to the input of a Channel II signal detector 7; line L4 is connected to the input of a Channel III signal detector 8; and line L5 is connected to the input of a Channel IV signal detector 9.

As will be made clear presently, each of the schematically represented channel signal detectors 6–9, are identical in structure and function to the system check signal detector 5. Therefore, only the system check signal detector 5 has been illustrated in detail, in order to facilitate presentation in the drawing.

Unless otherwise noted, each of the functional blocks described within is of conventional design; and therefore, it is referred to by a title familiar to persons skilled in the art, and its function is described in more detail.

The system check signal detector 5 includes a ringing detector *5a* receiving the inut lines L1. The ringing detector *5a* generates an output signal for each ring signal received on the line L1, and this output signal is fed to a stepping relay *5b*. A ring signal is the ordinary signal transmitted to energize the bell at a telephone being called, and they occur at fifteen second intervals.

The stepping relay *5b* is conventional, and it closes one set of contacts and opens the previous set responsive to each input pulse received. When it has received the fifth input pulse, its output, indicated by the reference numeral 5′ within block *5b*, triggers a twenty-second timer *5c*.

The twenty-second timer *5c* has a normal output and a complementary output, referred to respectively as *5d* and *5e*. When the twenty-second timer *5c* receives an input pulse from the fifth set of contacts of the stepping relay *5b*, line *5e* is energized, and it feeds back into the stepping relay *5b* to the sixth pair of contacts, represented as 6′ within the block *5b*. This signal will be coupled to the output of the stepping relay *5b* if the stepping relay *5b* receives another input pulse from the ringing detector *5a*. The reason for this will be made clear presently.

When the twenty-second timer times out, its output *5d* will again be energized, and the leading edge of this pulse will trigger a latching relay *5f*. However, if in fifteen seconds a sixth ring signal is received, which would be before the twenty-second timer *5c* ran out and indicate an unauthorized user, the signal on the active output lead *5e* of the timer *5c* is fed to the sixth set of contacts of the stepping relay *5b*. This will "hang up" the line L1, as will be explained below, by shorting the twisted pair of wires together thereby deactivating the detector and requiring a complete new dialing procedure before the transmitter may be controlled.

The latching relay *5f* also is conventional, and it has complementary outputs, *5g* and *5h*. A signal will appear at the output line *5h* responsive to the first pulse received at the input of the latching relay *5f*. The second pulse received at the input of the latching relay *5f* will de-energize output line *5h* and energize output line *5g*. The output line *5g* of the latching relay *5f* feeds a one-second timer *5i*, which in turn feeds one input of an OR gate *5j*. The other input of the OR gate *5j* receives the output of sixth contacts of the stepping relay *5b*. The output of the OR gate *5j* is coupled to a relay *5k*. The contacts *5k′* of the relay *5k* are normally open, and they are connected across the line L1 which feeds the input of the ringing detector *5a*. Hence, if the relay *5k* is energized, its contacts *5k′* will be closed thereby shorting the line L1 and signalling a disconnect to the telephone system 4 which has the same effect as hanging up a telephone receiver.

The operation of the system check signal detector 5 is as follows. Upon receiving the fifth output pulse from the ringing detector *5a* (indicating that the proper number has been dialed and allowed to ring five times), the fifth contacts of the stepping relay *5b* will close to energize the twenty-second timer *5c*. If a sixth pulse is received from the ringing detector *5a*, then the sixth contacts of the stepping relay *5b* will be energized, and the signal appearing on the line *5e* of the twenty-second timer *5c* will be coupled through the sixth contacts of the stepping relay *5b*, through the OR gate *5j* to energize the relay *5k* which, in turn, will short the input line and de-energize the system check signal detector 5 before it has generated an output pulse.

If a sixth input ring signal is not received from the ringing detector *5a* by the stepping relay *5b*, then the twenty-second timer *5c* will time out to energize its output line *5b* and latching relay *5f*. Hence, line *5h* from the system check signal detector 5 will be energized.

To then interrupt the signal on the line *5h*, the person who has signalled the alarm dials the same number a second time. When he then hangs up after the fifth ring, and the twenty-second timer *5c* times out, it will trigger the latching relay *5f* a second time. When the latching relay *5f* changes output states, it will energize the one-second timer *5i* which, when it times out, will feed a signal through the OR gate *5j* to energize the relay *5k* and disconnect line L1.

Each of the channel detectors 6–9 are similar to the system check signal detector except that they respond to their own associated numbers and are fed on separate lines. Each will generate an output pulse when its number has been dialed and the incoming ringing signal has been allowed to ring only a total of five times, and each may be disconnected by repeating the same procedure.

Figure 3:
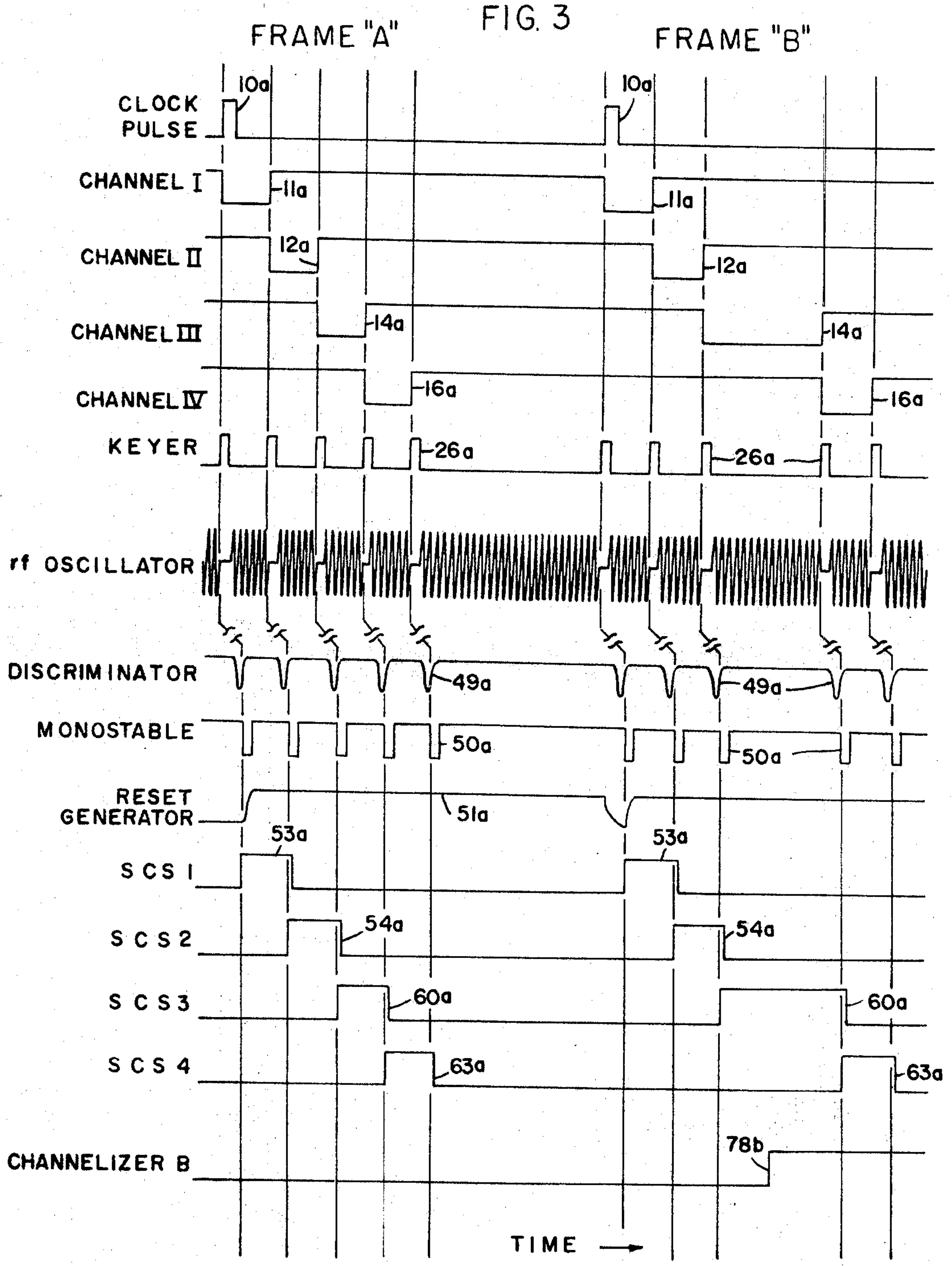
FIG. 3 is a timing diagram illustrating the signal processing in the transmitter and receiver of FIGS. 1 and 2.

Still referring to FIG. 1, the transmitter will now be described in detail. A clock pulse generator 10 feeds a monostable circuit 11. The clock pulse generator 10 is of conventional design and comprises a free-running unijunction oscillator which periodically generates a clock pulse. The clock pulses are represented on the first row of FIG. 3 as relatively narrow, positive-going pulses; they are designated *10b*. FIG. 3 is a timing diagram for the digital signal processing only; and the rows (which are identified on the left hand side of the figure) represent voltage waveforms of various system components. The columns represent channels or time slots for communicating. The leading edges of adjacent clock pulses define what is hereinafter referred to as a frame. The channels are separate time slots placed in successive positions within a frame. Hence, all of the channels lie between leading edges of successive clock pulses. Two such frames labeled A and B are illustrated at the top of FIG. 3.

The monostable circuit 11 generates an output pulse of a predetermined time responsive to a positive-going leading edge presented at its trigger input. As is common, the monostable circuit 11 has a complementary output (that is, a signal lead which exhibits the complementary binary signal present on its main output); and although it is not used in this particular channel, it could be used to define the end of a channel as will be made clear presently. Output pulses from the monostable circuit 11 are denoted 11*a* on line 2 of FIG. 3, and this signal within a given frame defines Channel I. As can be seen from FIG. 3, the positive-going leading edges of the clock pulses 10*a* trigger the monostable circuit 11, and it generates a negative-going pulse 11*a* for predetermined time.

The output of monostable circuit 11 is coupled to the trigger input of a monostable circuit 12 and to an amplifier 13. The monostable circuit 12 is similar in design and function to the monostable circuit 11. The amplifier 13 is a conventional amplifier which preferably is biased near cut-off so that when it receives an input pulse from the monostable circuit 11, it generates at its output a pulse having the same width as the input pulse but a sharper rise time. The amplifier 13 also functions as an isolation circuit for isolating the output of monostable circuit 11 from other monostable circuits defining additional channels.

The output pulse of monostable circuit 12 defines Channel II in the system, and is denoted by reference numeral 12*a* on line 3 of FIG. 3. The output of monostable circuit 12 is fed to the trigger input of a similar monostable 14 and to the input of an amplifier 15, similar to the amplifier 13. The output of monostable circuit 14 is referred to as 14*a* on line 4 of FIG. 3, and it defines Channel III of the system.

The output of monostable circuit 14 is coupled to the trigger input of a similar monostable circuit 16 and to an amplifier 17, similar to the amplifier 13. The output of monostable circuit 16 is referred to as 16*a* on line 5 of FIG. 3, and it defines Channel IV. The output of the monostable circuit 16 is coupled to an amplifier 20 which is similar to the amplifier 13.

Each of the monostable circuits 11, 12, 14, and 16 has a resistance-capacitance timing circuit which determines the width of its output pulse. This is, of course, well known. In the present system, each of these timing circuits is adapted to have one of two discrete time constants. This is accomplished by separating the resistance in the timing circuit into two separate fixed resistors, and including both resistors in the timing circuit when the longer output pulse is desired, and shorting out one of the resistors by means of a separately controlled relay when the shorter output pulse is desired.

The relays are designated in FIG. 1 by the reference numerals 21, 22, 23, and 24; and the dotted lines between a relay and a monostable circuit indicate the coupling to its contacts which are normally closed across one of the resistors in the monostable timing circuit.

Each of the relays 21–24 are separately operated thereby allowing independent setting of the timing circuits in their associated monostable circuits. The input signals to the relays 21–25 are received respectively from the channel signal detectors 6–9. If a given channel signal detector is properly signalled, as described above, it will generate a signal which will energize a relay to lengthen the time constant of its associated monostable circuit. Each of the outputs of the channel signal detectors 6–9 are also fed to a transmitter code enable gate, described below, and referred to as a carrier control circuit.

The output of the amplifiers 13, 15, 17, 19, and 20 are all coupled together and fed to the signal input of a modulator keyer 26. A second input is coupled to the inhibit input of the modulator keyer 26 from a carrier control circuit 27 which, in turn, receives input signals from the system check signal detector 5 and from the channel signal detectors 6–9. The modulator keyer 26 is a monostable circuit with some elementary logic gates. It has a signal input which receives the output of the isolation amplifiers and an enable input which receives the output from the carrier control circuit 27.

When a signal is present on the enable input of the modulator keyer 26, it enables the passage of whatever signal is on its signal input. Conversely, when the signal is removed from the enable input, whatever signal is on the signal input will not be allowed to trigger the monostable circuit in the modulator keyer to generate output pulses. It can be seen that even though each clock pulse, absent energization of the relays 21–24 will cause the shorter channel pulses to be generated in succession; these will not be transmitted further than the input logic circuitry of the keyer 26 unless it, in turn, receives a signal on its enable input from the carrier control circuit 27. The carrier control circuit 27 has the function of a logic OR gate in that it enables the modulator keyer 26 whenever it receives an input signal from the system check signal detector 5 or any of the Channel I–IV signal detectors 6–9.

As mentioned, in addition to the logic function that is performed by the modulator keyer 26, the output stage is a monostable circuit which generates a pulse of fixed duration responsive to a negative-going voltage on its signal lead. With a signal on its enable input, the information (i.e., the monostables and amplifiers) generated in the encoding section of the transmitter will be gated through the signal input to the output monostable of the modulator keyer 26. The output of the modulator keyer is seen on line 5 of FIG. 3 as a string of narrow pulses 26*a* (preferably 200 microseconds in duration) generated when any of the channel outputs exhibits a negative-going pulse.

The output of the modulator keyer 26 is connected to one input of a gate circuit 26*b*. The corresponding output of the gate circuit 26*b* is fed to an inhibit input of a free-running radio frequency oscillator 28. The gate circuit 26*b* is a logic circuit having two signal inputs and two signal outputs, one associated with each input. It also has a control input which is driven by an astable circuit 26*c*.

The astable circuit 26*c* generates at one side of its complementary output, an "on" pulse of one second duration followed by an "off" pulse of fourteen seconds duration. The "on" pulse of one second enables the modulator keyer 26 to be coupled to the radio frequency oscillator 28.

The complementary output of the astable circuit 26*c* (that is the fourteen second "on" pulse) enables the output signal of a voice frequency modulator 26*c* to be coupled to the radio frequency oscillator 28. The input to the voice frequency modulator 26*c* is schematically represented by the block labeled voice input and identified by reference numeral 26*d*. It will be understood that this voice input 26*d* could be a prerecorded message or an actual voice on line, depending upon the application. Its operability, in any case, is controlled by the output of the carrier control circuit 27, as illustrated.

Hence, there will be a periodic alternation in feeding the oscillator 28 between the modulator keyer 26 and the voice frequency modulator 26*c*, with the "on" time ratio being fourteen to one in favor of the voice channel.

The signal from the keyer 26 is a digital signal, enabling or blanking the oscillator 28; and the signal from the voice frequency modulator 26*c*.

The output signal from the modulator keyer 26 (when passing through gate 26*b*) will inhibit the generation of the radio frequency oscillations in the oscillator 28. Hence, whenever a signal is presented to the signal input of the modulator keyer 26, and a signal is present on the enable input to the modulator keyer 26, the oscillations within the oscillator 28 will be periodically damped for a period of 200 microseconds (i.e., the width of the output pulse of the monostable in the modulator keyer 26) for one second durations. Such an output signal from the radio frequency oscillator is schematically illustrated on line 7 of FIG. 3 and identified by reference numeral 28*a*.

The output signal of the radio frequency oscillator 28 feeds a radio frequency amplifier 29 which drives a power amplifier 30. The output signal of the power amplifier 39 is fed through a matching network 31 to a transmit antenna 32. The radio frequency amplifier 29, the power amplifier 30, the matching network 31, and the antenna 32 may be any of a number of suitable designs well known in the art of radio frequency communication.

Figure 4:
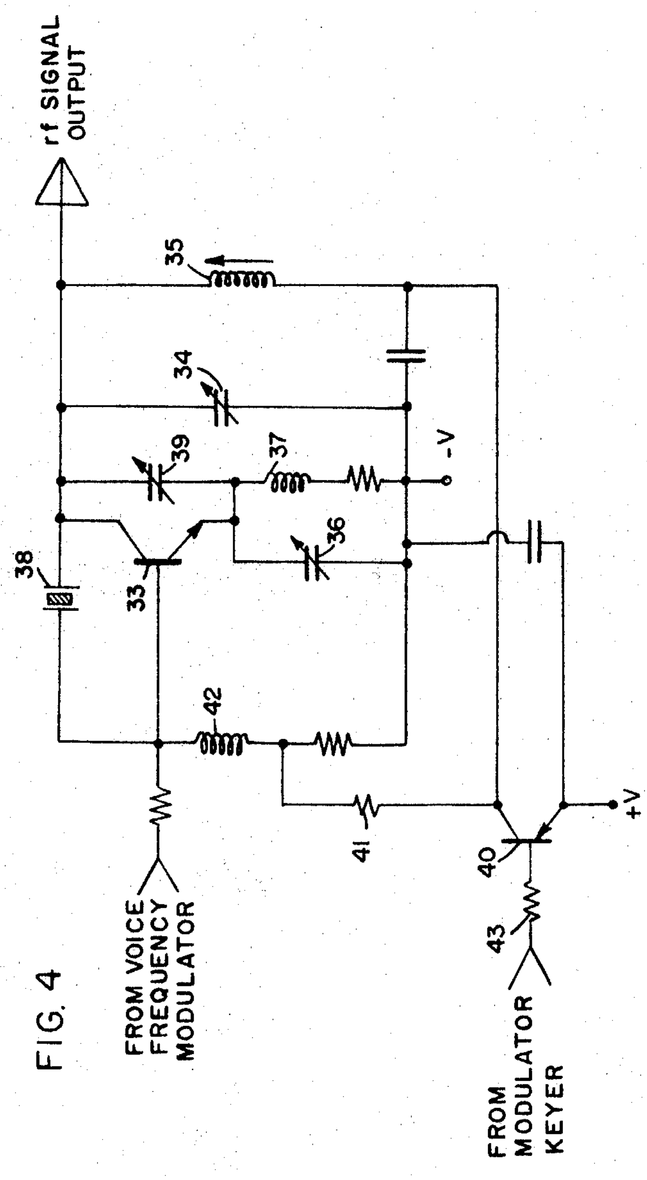
FIG. 4 is a circuit schematic diagram of the modulator keyer of the transmitter.

The quenching of the output signal of the radio frequency oscillator by the modulator keyer 26, and the particular circuit used as the oscillator is shown in greater detail in FIG. 4.

As it can be seen in FIG. 4, the amplifier which forms the oscillator is a transistor 33 having a first parallel tuned circuit including a variable capacitor 34 and a variable inductance 35 in its collector circuit, a second parallel circuit including a variable capacitor 36 and a fixed inductor 37 in its emitter circuit. A crystal 38 is connected between the base and collector junctions of the transistor 33. A third tuning capacitor, designated 39, is connected between the collector and emitter junctions of the transistor 33.

The transistor which provides the quenching action is designated as 40, and its emitter is coupled to the positive terminal of the power supply. The collector of transistor 40 is directly coupled to the collector of the transistor 33 through the variable inductance 35. The collector of the transistor 40 is also coupled through a bias resistor 41 and a radio frequency choke 42 to the base of the transistor 33. The input is received from the modulator keyer 26 coupled through a resistor 43 to the base of the transistor 40, and the output from the radio frequency oscillator 28 is taken directly from the collector of the transistor 33, illustrated.

A positive signal from the monostable output of the modulator keyer 26 will turn off the transistor 40 thereby interrupting the positive power supply to the collector of the transistor 33 and also interrupting the bias current to the base of the transistor 33. The large amount of negative feedback provided by the parallel tuned circuit in the emitter circuit of transistor 33 and the output signal coupled back through the crystal 38 will then damp the oscillations in an extremely short time.

In the preferred embodiment, the oscillator frequency is 30 megacycles per second, and it has been found that this signal can be completely damped within three complete cycles of the oscillations by switching the power supply as indicated, and by providing the negative feedback as shown in FIG. 4.

The output lead from the gate circuit 26*b* which carries the signal of the voice frequency modulator 26*c* is coupled through a resistor 43*a* to the base of the transistor 33.

Figure 2:
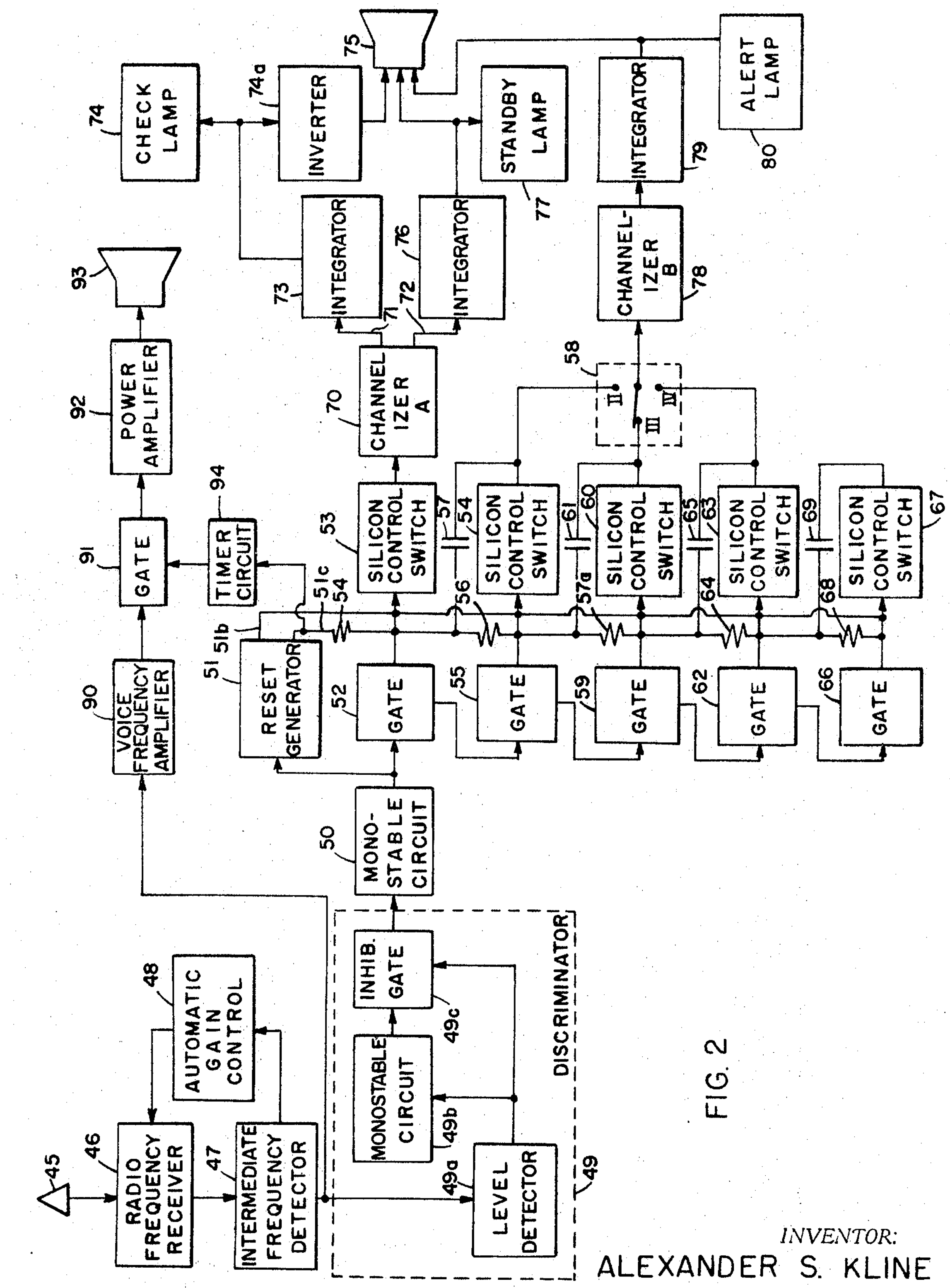
FIG. 2 is a functional block schematic of a receiver according to the present invention.

Turning now to FIG. 2, the receiver is shown in functional block diagram form. A receiving antenna 45 receives the input radio frequency signal and couples it to a conventional radio frequency receiver 46 which preferably is superheterodyned and includes radio frequency automatic gain control. The output of the RF receiver 46 is fed to an intermediate frequency detector 47 which generates a signal for feeding back through an automatic gain control circuit 48 to the radio frequency receiver 46, as is well known. The output of the detector 47 is an analog signal proportional to the amplitude of the envelope of the received radio frequency signal, and it is coupled to the input of a discriminator circuit 49 (shown enclosed in dash line) which feeds a monostable circuit 50. The output of the detector 47 is also coupled to a voice detection loop which will be explained more fully below.

In more detail, the discriminator 49 comprises a level detector circuit 49*a* receiving the input signal and feeding a monostable circuit 49*b* and an inhibit input of a gate circuit 49*c*. The output of the monostable circuit 52 feeds the signal lead of the gate 49*c*. The level detector circuit is simply a transistor amplifier biased slightly in the cutoff region and having a very high gain. A slight noise at the input will not drive it into the active region; however, when sufficient signals strength is received from the detector 47, the level detector 49*a* acts as a limiting amplifier to generate a pulse having a sharp rise time. Hence, the level detector 51 will not fire for certain lower level inputs and will amplify greatly input signals above the predetermined level.

The discriminator 49 performs another logic function for rejecting unwanted input pulses. It will be remembered that the radio frequency energy transmitted from the transmitter is interrupted for predetermined and constant time durations. These time durations are 200 microseconds and they never vary. It is the interval between interruptions (of RF energy) that contains the information, and not the duration of the interruption.

Only those signals which are less than the pulse width of the modulator keyer in the transmitted (plus some tolerance, if desired) are accepted by the receiver. This is accomplished by having the monostable circuit 49*b* triggered by the level detector 49*a*, and the output signal from the monostable circuit 49*b* lasting for a duration of approximately 270 microseconds. It will be noted that with this arrangement, the discriminator will also reject the voice channel signal when it is present.

The gate 49*c* is simply a logic element having a signal lead and an inhibit lead. If the inhibit lead is energized, then whatever signal is on the signal lead will not be permitted to pass to the output of the gate; conversely, if the inhibit input is not energized, then whatever signal is present on its signal lead will pass to its output terminal. The trailing edge of the output pulse in the monostable circuit 49*b* will be fed through the gate 49*c* only if the output signal from the level detector had returned to its quiescent value (that is, it is less than 270 microseconds in duration and is not inhibiting the passage of pulses through the gate 49*c*). If the output pulse of level detector 49*a* lasts longer than the output pulse from the monostable circuit 49*b*, then it is an unacceptable pulse, and the gate 49*c* will inhibit the passage of the trailing edge of the output pulse of the monostable circuit 49*b*.

Hence, the monostable circuit 50 is triggered by the trailing edge of the monostable circuit 49*b* which passes (after some delay due to the discrimination against longer pulses) through the signal lead of the gate 49*c* if not inhibited by the output of the level detector 49*a*. The monostable circuit 50 functions essentially as a pulse-shaping circuit, and it generates constant width pulses independent of input pulse width and responsive only to a changing input signal.

The output of the monostable circuit 50 feeds the input of a reset generator 51 and a gate 52.

The reset generator 51 is another monostable circuit, but it has a relatively long time constant, and it will continue to generate a positive output signal as long as it is being triggered at its input by a pulse train which had been accepted by the discriminator 49.

The gate 52 is a conventional pulse steering or switching gate and it has a first output (taken along the horizontal in FIG. 2). When a signal is presented at its input terminal, the signal will appear on its first output terminal unless there is present on this first output terminal, a bias voltage. If such a bias voltage is present on this first output lead, then it is in effect cut off, and the input signal will be switched or steered to the second output. The output pulses 49*a* of the discriminator 49 are shown on line 8 of FIG. 3; and the output pulses 50*a* of the monostable circuit 50 are shown on line 9 of FIG. 3. The output (51*a* on line 10 of FIG. 3) of the reset generator 51 during a given frame is shown to be a relatively long positive level when information is being transmitted which is acceptable to the discriminator 49. This positive signal, as will be explained in more detail, is the bias signal fed in steps to successive first outputs of steering gates similar to gate 52.

A silicon control switch 53 receives at its input (which is actually the gate terminal of the device) the output of the reset generator 51 and the first output of the gate 52. The output of the reset generator 51, however, is coupled through a resistor 54. The second output of the gate 52 drives a similar gate 55. The input of a second silicon control switch 54 receives the first output of gate 55, and it is also coupled to the gate lead of the silicon control switch 53 through a resistor 56. The output of the silicon control switch 54 is coupled through a capacitor 57 to the input of the silicon control switch 53, and to a first fixed contact of a selection switch 58. The first fixed contact referred to here is associated with a roman numeral two indicating that this is the second channel of information.

The second output of the gate 55 is coupled to the input of a similar gate 59. The input of a third silicon control switch 60 receives the first output of the gate 59, and it is also coupled to the input of the silicon control switch 54 through a resistor 75*a*. The output of the silicon control switch 60 is coupled through a capacitor 61 to the input of the silicon control switch 54, and to a second fixed terminal (Channel III) on the selection switch 58. The second output of gate 59 is fed to a similar gate 62.

The input of a silicon control switch 63 receives the first output from the gate 62, and is coupled to the input of the silicon control switch 60 through a resistor 64. The output of silicon control switch 63 is coupled through a capacitor 65 to the input of the silicon control switch 60, and to a third position (Channel IV) on the selection switch 58.

The second output of the gate 62 is coupled to the input of a similar gate 66. The input of a silicon control switch 67 receives the first output of the gate 66 directly and the input of the silicon control switch 63 through a resistor 68. The output of the silicon control switch 67 is coupled through a capacitor 69 to the input of the silicon control switch 63.

The outputs of each of the silicon control switches 53, 54, 60 and 63 represent the decoded signals comprising Channels I, II, III, and IV, as will now be explained.

As already mentioned, each of the steering gates 52, 55, 59, 62 and 66 will transmit the signal received at its input to its first output if that output has a relatively negative bias on it. Each of the silicon control switches is normally "on" (i.e., conducting) and the voltage on its input gate terminal will be relatively negative, and the input impedance of the switch will be high. Since the first output of each of the steering gates is connected to an associated silicon control switch, an input signal to the gate will turn the associated silicon control switch "off" (i.e., non-conducting). If the first output of the steering gate has a relatively positive bias voltage (generated by the reset generator 51), the input signal will be steered to the second output of the gate. It is the function of the reset generator 51 and the resistors 54, 56, 57, 64 and 68 in cooperation with the inputs of the silicon control switches to consecutively feed a positive bias voltage to the first output of adjacent switching gates.

The digital decoding operation will now be explained. For the moment, only those waveforms indicated in Frame A of FIG. 3 will be referred to since this represents a normal condition. The first pulse generated by the monostable circuit 50 (which is a negative-going pulse as seen on line 9 of FIG. 3) is fed through the steering gate 52 to turn the silicon control switch 53 to an off state thereby generating a positive-going step function (at 53*a* on line 11 of FIG. 3) output. At the same time, the first pulse of the monostable circuit 50 triggers the reset generator 51, which in turn generates a positive voltage (51*a* of line 10 in FIG. 3) for applying bias to the first output of the gate 52 through the resistor 54. It will be noted that, due to a delay in the reset generator 51, this positive bias generated at the first output of the gate 52 occurs after the silicon control switch 53 has been turned off. This has been slightly exaggerated on lines 10 and 11 of FIG. 3 for clarity.

Since the first output of the gate 52 now has a positive bias on it, the second pulse generated by the monostable circuit 50 is steered through the gate 52 to its second output and through the gate 55 to turn the silicon control switch 54 to an off state (represented by signals 54*a* on line 12 of FIG. 3). The positive-going output pulse in silicon control switch 54 is then coupled through the capacitor 57 to the input of the silicon control switch 53 to turn it back on. Hence, as can be seen from FIG. 3 (again slightly exaggerated since the turning on of one switch and the turning off of the preceding one are practically simultaneous), the trailing edge of the pulse 53*a* occurs somewhat after the time that the second silicon control switch has been turned off (i.e., its leading edge). At the same time, since the silicon control switch 53 is now back in an on condition, a relatively high input impedance is seen at its gate lead, and the bias voltage generated by reset generator 51 is coupled through the resistor 56 and appears at the input gate lead to the silicon control switch 54 which in turn biases the first output of the gate 55 positive. It is noted that the second output pulse from the monostable circuit 50 also re-triggered the reset generator 51 to maintain its output state.

The third output pulse from the monostable circuit 50 also re-triggers the reset generator 51 to maintain its output level, and it is also fed through the gates 52, 55, and 59 (its first output) to turn silicon control switch 60 to an off condition. The output pulse from silicon control switch 60 is represented diagrammatically on line 13 of FIG. 3 as 60*a*. When silicon control switch 60 turns off, a positive pulse is coupled through capacitor 61 to switch silicon control switch 54 back to its on state thereby ending the pulse 54*a* and stepping the bias voltage from reset generator 51 through resistor 64 to the first output of the gate 62.

The next output pulse of the monostable circuit 60 will again trigger the reset generator 50 and be fed through the gates 52, 55, 59 and 62 to turn the silicon control switch 63 to an off state. The output pulse from the silicon control switch 63 will turn the silicon control switch 60 back on.

Finally, the fifth pulse generated by the monostable circuit 50*a* will be coupled through all of the gates 52, 55, 59, 62 and 66 to trigger the silicon control switch 57 to an off state. The output of the silicon control switch 67 will then be coupled through the capacitor 69 to turn the silicon control switch 63 back on thereby terminating the end of Channel IV of the decoded signals in the receiver. The output of the silicon control switch 63 is indicated on line 14 of FIG. 3 as 63*a*.

Hence, the output signals from the silicon control switches 53, 54, 60 and 63 represent respectively the information on Channels I, II, III and IV of the transmitter. The reset generator 51, since it receives no additional input pulses, will time out and its complementary output, 51*b*, is coupled directly to the input terminal of all the silicon control switches for insuring that they are reset to an "on" condition when it times out.

It will be obvious that any number of channels on the transmitter and receiver may thus be accommodated with the present system. The processing of the decoded channel pulses will now be described in detail.

The output of the silicon control switch 53 (Channel I) is coupled to the input of a channelizer A, identified by reference numeral 70 in the drawing. The A channelizer, as will be described in more detail presently, has first and second output leads designated respectively as 71 and 72. The A channelizer 70 will generate a signal on the output line 71 if the width of the input pulse received from silicon control switch 53 is less than the standard width of a channel (determined by the shorter time constants in the encoding monostables of the transmitter). The A channelizer 70 will generate a signal on its output line 72 if the pulse received from the silicon control switch 53 is greater than the standard channel width. Output line 71 feeds an integrator circuit 73 which drives a check lamp 74 and, in series, an inverter 74*a* and a speaker 75. The output line 72 from the A channelizer 70 feeds a second integrator circuit 76 which in turn drives a standby lamp 77 and the speaker 75 in parallel.

The wiper arm of the selection switch 58 is coupled to the input of a B channelizer, indicated by reference numeral 78. The B channelizer 78 feeds an integrator circuit 79. The integrator circuit 79 drives an alert lamp 80 and the speaker 75 in parallel.

The B channelizer 78 is similar to the A channelizer 70 except that it has only one output lead, and a signal is generated on its output lead only when the input pulse signal received from whichever of the channels it is connected to (i.e., Channel II, III, or IV) is greater than the standard channel width.

Figure 5:
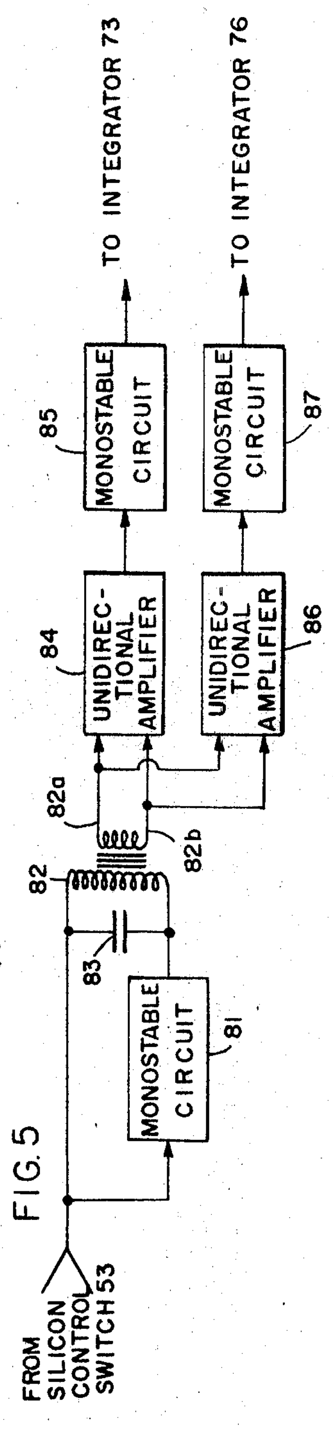
FIG. 5 is a circuit schematic diagram of the channelizer circuit of the receiver.

The A channelizer 70 is seen in more detail in FIG. 5. The received input pulse triggers a monostable circuit 81 and is fed to one side of a transformer 82. The monostable circuit 81 generates a negative output pulse which is greater than a standard channel width but less than the elongated channel width. In practice, I have found that a suitable arrangement is to have a standard channel width of 400 microseconds and an elongated width of 1600 microseconds. In this case, the output pulse of the monostable circuit 85 is set to last for 1000 microseconds.

This negative output pulse (opposite in polarity to the received pulse) is coupled to the other side of the transformer 82. A capacitor 83 is connected across the terminals of the transformer 82 to account for the slight delay through the monostable circuit 81.

The secondary winding, comprising lines 82*a* and 82*b*, of the transformer 82 is coupled to a unidirectional amplifier 84 which in turn feeds a monostable circuit 85. The output of the monostable circuit 85 is connected to the integrator circuit 73.

The secondary winding of the transformer 82 also feeds a second unidirectional amplifier 86 which feeds a second monostable circuit 87. The output of the monostable circuit 87 is connected to the input of the integrator circuit 76.

The unidirectional amplifiers 84 and 86 are conventional transistor amplifiers biased near cut-off. The amplifier 84 is such that if the signal on line 82*a* is positive relative to the signal on line 82*b*, the amplifier 84 will generate an output signal to trigger the monostable circuit 85. However, if the signal on the line 82*a* is negative relative to the signal on the line 82*b*, then the transistor will be driven further into cut-off and the unidirectional amplifier 84 will not generate any output pulse. The unidirectional amplifier 86 has the complementary characteristic of being sensitive only to negative and not to positive pulses on its input terminals. This may be accomplished by either biasing the transistor near saturation or using a complementary transistor to that used in the amplifier 84.

Hence, it can be seen that the monostable circuit 85 will be triggered by the amplifier 84 and thereby feed its associated integrator circuit 73 whenever a pulse of standard channel width is being transmitted over Channel I. The monostable circuit 87 will be triggered by the amplifier 86 to drive its associated integrator circuit 76 whenever the second discrete channel width (i.e., the longer one) is being transmitted over Channel I.

The B channelizer, represented by reference numeral 78, differs from the A channelizer 70 in that the B channelizer 78 has only one unidirectional amplifier feeding a monostable circuit for driving the integrator circuit 79. This unidirectional amplifier is similar to the prevously-described amplifier 86 so that the B channelizer is responsive only to the second (longer) discrete channel width.

The siren 75 is preferably driven by a timing relay (not shown) to cut off a predetermined time after it has been energized. This is because if the system is being checked and there is no one at the receiver to manually turn off the siren 75, it would continue operation indefinitely. It will be noted that the siren 75 is driven simultaneously if either the standby lamp 77 or the alert lamp 80 is energized, but if the check lamp 74 is energized, the siren is driven only when it is turned off because the inverter 74*a* inverts out of the integrator 73.

Each of the integrator circuits 73, 76, and 79 generate an output signal only after receiving some predetermined number of input signals, as will be clear from the following discussion of system operation, they will not energize the visual audible alarms unless the same signal has been received over the same channel consecutively a number of times.

Still referring to FIG. 2, detection of the voice signal will now be described. A voice frequency amplifier 90 receives the output signal from the intermediate frequency detector 47. Voice frequency amplifier 90 is of conventional design; and it comprises a linear amplifier designed to operate in the voice frequency range.

The voice frequency amplifier 90 feeds the signal input of a gate 91, which in turn drives a power amplifier 92 which energizes a speaker 93.

The enable input of the gate 91 is energized by a timer circuit 94. The timer circuit 94 is driven by the output lead 51*c* of the reset generator 51. Hence, whenever the discriminator 49 processes appropriate digital information, the reset generator 51 will trigger the timer 94 which will generate an output pulse for 18 seconds (i.e., somewhat longer than a complete cycle time including the digital and voice information). As long as the timer circuit 94 continues to be reset at periodic intervals of less than 18 seconds, the gate 91 will be enabled, and the output of the voice frequency amplifier 90 will be coupled to the speaker 93.

It will be obvious that the function of the speaker 93 may be coupled with the function of the speaker 95 with slightly more elaborate logic circuitry; but the operations have been simplified in the drawing for purposes of illustration. Secondly, it will be noted that the gate 91 could be energized by one of the integrator circuits 73, 76, or 79, depending upon which channel its associated receiver is keyed to receive.

OPERATION

Having thus described in detail preferred embodiments of control signal detecting equipment, a receiver, a transmitter, the voice channel, and various individual circuits advantageously used in the instant invention, the overall operation will now be described in detail.

Typically, the system would be checked for operability periodically, for instance, on Tuesday at noon as is now commonly done. This is accomplished by having the line L1 dialed and rang five times, the caller then hangs up before the sixth ring. The system check signal detector will detect this and generate a signal which passes through the carrier control circuit 27 to enable the modulator keyer 26. Hence, the RF oscillator 28 (which had been continuously operating to enhance the signal to noise ratio of the system due to the automatic gain control in the receiver) will now be periodically quenched for a period of 200 microseconds at intervals of 400 microseconds. This will occur for one second out of fifteen.

The receivers in the area will sense that a legitimate code is being received, and that on Channel I there is a pulse width of a standard channel width. The A channellizer will then energize its integrator circuit 73 for a predetermined number of times. After this, the integrator circuit 75 will actuate the check lamp 74 signalling that the system is operational. A voice signal may also have been coupled to the receivers.

The operator then dials L1 again to remove the output signal from the signal check system detector 5, as has been described. The receiver, upon sensing this, de-energizes the check lamp 74, which step energizes the siren 75 through the inverter 74*a* for an arbitrary time.

If an operator wanted to tell his whole area to standby, he dials L2 following the outlined procedure. This will generate an output pulse on the Channel I signal detector 6 to activate the relay 21 which effects a longer time constant for the monostable circuit 11. This will transmit (in Channel I) a quenched RF signal at a 1600 microsecond interval, and the receiver will then energize the standby lamp 77 and the siren 75 simultaneously. Intermittently, the voice channel is operative.

If the real emergency existed, for example, only in a certain zone, it is transmitted to all receivers, but only those having a B channelizer coupled to the pertinent channel would get an alert signal.

In addition to the enhanced signal to noise ratio due to the automatic gain control, any noise signal which is received is further prevented from entering the decoding circuitry by the level detector 51 in the discriminator section 49, since if the noise signal does not rise above a certain predetermined level, it will not be accepted by the level detector 51. In addition to this, even if the level detector 51 is energized by a spurious noise signal, the discriminator 49 will not trigger the monostable 50 unless the pulse duration of the noise signal is less than the output signal of the monostable circuit 49*b*. It will be obvious that the reliability of the system is further enhanced as the channel number increases since a larger number of noise pulses must be processed through the monostable circuit 50 without having the reset generator 51 time out thereby resetting all the silicon control switches. A still further enhancement of the reliability of this system is afforded by means of the integrator circuits at the output of the channelizers which require a predetermined number of pulses, such as fifteen, of the same output signal before they will generate an alert signal.

It will be obvious to persons skilled in the art that many of the circuits and functional block diagrams described above may be modified without departing from the principle of present invention; it is therefore intended that all such equivalent structures and modifications be covered as they are embraced within the spirit and scope of the appended claims.

I claim:

1. An emergency communication system comprising: transmitter means including encoding means and radio frequency transmitting means, said encoding means adapted to generate a coded signal representative of a series of successive time channels, each of said channels capable of assuming one of a discrete number of time settings, said encoding means including clock pulse generator means for periodically generating clock pulses, a plurality of monostable circuits ordered in series such that the trailing edge of an output signal of one of said monostable circuits triggers a subsequent monostable circuit, the first of said monostable circuits triggered by said clock pulse generator and all of said monostable circuits sequentially triggered between successive clock pulses, isolation means receiving the output signals of said monostable circuits for coupling them together, and means receiving said coupled outputs from said isolation means for generating a predetermined, discrete signal for modulating said radio frequency transmitting means responsive to one edge of the output pulse of each of said monostable circuits; means for selecting a channel and for setting it to a predetermined one of said discrete settings; means responsive to said selecting means for gating the coded signal from said encoding means to said radio frequency transmitting means for modulating said transmitting means to transmit said modulated signal; control circuit means for enabling said modulator discrete signal to modulate said continuous radio frequency signal for a predetermined time whereby said channels are represented by intervals between adjacent modulations of said radio frequency signals; and receiver means receiving said modulated signal for generating signals indicative of each of said predetermined channel settings.

2. The apparatus of claim 1 wherein said selecting means further comprises a plurality of telephone lines, each being independently addressable and means for energizing said control lines responsive only to a predetermined number of ringing signals received over an associated telephone line.

3. The apparatus of claim 1 further comprising means associated with said transmitter means for establishing a voice communication channel intermediate said digital channels; and means in said receiver for decoding said voice channel and for coupling the decoded signal to an output responsive to the reception of said digital signal.

4. An emergency communication system comprising: a transmitter for transmitting a continuous radio frequency signal modulated at predetermined intervals for constant durations, said intervals defining channels; a receiver including means receiving said radio frequency wave and detecting means for generating a signal representative of the envelope of said received wave; a discriminator receiving the output of said detecting means for generating a signal only when said detector signal indicates that said modulations have occurred for a predetermined range of time, said discriminator including a level detector receiving the output of said detector means for generating a binary level signal only when said detector signal exceeds a predetermined limit, a first monostable circuit receiving the output of said level detector, and a gate circuit having a signal lead and an inhibit lead, said signal lead of said gate circuit receiving the output of said monostable circuit, and the inhibit lead of said gate circuit receiving the output of said level detector, whereby said discriminator generates an output signal at said gate only when said received signal is shorter than the output signal of said monostable circuit; and decoding means receiving the output signal of said discriminator for generating signals representative of said predetermined intervals between modulations of said transmitted radio frequency signal.

5. The apparatus of claim 4 wherein said output signal generating means comprises a plurality of binary circuit means; means for receiving said discriminator signal and for gating it sequentially to successive ones of said bistable circuits; and means coupled to each of said binary circuits for changing the state of the previous binary circuit when it is energized, the first signal received by said discriminator is gated to the first of said binary circuits to change its states, successive signals from said discriminator being gated to successive binary circuits, each binary circuit being energized thereby de-energizing the adjacent previously energized binary circuit, whereby the output of each of said binary circuits is representative of the time differences between successive modulations of said radio frequency signal.

6. The system of claim 5 further comprising channelizer means coupled to one of said binary circuit elements for generating an output signal indicative of the discrete time duration of said transmitted channel thereby decoding said channel information.

7. The apparatus of claim 5 further comprising a channelizer coupled to the output of one of said binary circuits for generating a signal only when said output of said binary circuit is greater or less than a predetermined time, said channelizer thereby comparing said received signals with a standard to determine which discrete setting has been effected in a given channel.

8. The apparatus of claim 4 wherein said decoding means comprises: means receiving said discriminator output signal for generating a signal indicative of said received signal being greater or less than a predetermined time; and integrator means responsive to a predetermined number of said channelizer output signals for signalling an alarm.

9. In combination with a receiver for an emergency communication system wherein said receiver receives radio frequency energy modulated for a constant period of time at predetermined intervals defining channels, the improvement comprising: said intervals being characterized by assuming one of two discrete durations and comprising means in said receiver receiving said decoded information for comparing said decoded information with the output signal of a monostable circuit triggered by the received signal, said monostable output signal being of a fixed duration immediate said discrete durations of said transmitted signal; means responsive to said comparing means for generating a signal indicative of said first received channel information being longer than said monostable circuit output signal; and means for generating a second signal indicative of said discrete interval being longer than said monostable circuit output signal.

References Cited

UNITED STATES PATENTS

| | | | |
|---|---|---|---|
| 2,722,598 | 11/1955 | McDonald | 170—2 X |
| 2,812,509 | 11/1957 | Phelps | 325—55 X |
| 3,366,881 | 1/1968 | Malone | 325—322 X |

RALPH D. BLAKESLEE, Primary Examiner

U.S. Cl. X.R.

179—5; 325—55, 322